United States Patent [19]

Hunahata et al.

[11] Patent Number: 4,906,073
[45] Date of Patent: Mar. 6, 1990

[54] LIQUID CRYSTAL DISPLAY DEVICE USING NEMATIC LIQUID CRYSTAL HAVING TWISTED HELICAL STRUCTURE AND A PHASE CORRECTION PLATE

[75] Inventors: Katuyuki Hunahata; Yuji Mori; Jun-ichi Hirakata; Yoshiharu Nagae, all of Hitachi; Hideaki Kawakami, Mito; Kiyoshige Kinugawa, Chiba; Yasuhiko Kando, Mobara, all of Japan

[73] Assignee: Hitachi, Ltd., Tokyo, Japan

[21] Appl. No.: 224,653

[22] Filed: Jul. 27, 1988

[30] Foreign Application Priority Data

Jul. 29, 1987 [JP] Japan ................................ 62-187593

[51] Int. Cl.⁴ .............................................. G02F 1/13
[52] U.S. Cl. ................................ 350/347 R; 350/346; 350/335; 350/347 E
[58] Field of Search ............... 350/339 R, 346, 347 R, 350/335, 347 E

[56] References Cited

U.S. PATENT DOCUMENTS 4,385,806  5/1983  Fergason ...................... 350/347 R
4,697,884 10/1987  Amstutz et al. ................ 350/346 X

FOREIGN PATENT DOCUMENTS 2729972  1/1978  Fed. Rep. of Germany .
3314632 10/1984  Fed. Rep. of Germany .

Primary Examiner—Stanley D. Miller
Assistant Examiner—Richard F. Gallivan
Attorney, Agent, or Firm—Antonelli, Terry & Wands

[57] ABSTRACT

In a liquid crystal display device, light transmitting through a liquid crystal layer is colored depending on the structural conditions of the liquid crystal display device. The phase of the transmission light is corrected by means of a phase correction plate to make the transmission light approximate achromatic color, thereby permitting monochromatic display or color display.

12 Claims, 9 Drawing Sheets

TWIST ANGLE θ2 OF LIQUID CRYSTAL
ELEMENT FOR CORRECTION (DEGREE)

FIG. 14

Δn·d OF POLYCARBONATE FILM (μm)

LIQUID CRYSTAL DISPLAY DEVICE USING NEMATIC LIQUID CRYSTAL HAVING TWISTED HELICAL STRUCTURE AND A PHASE CORRECTION PLATE

BACKGROUND OF THE INVENTION

This invention relates to liquid crystal display devices and more particularly to a field effect type liquid crystal display device having excellent time-division driving characteristics and being capable of monochromatic or black and white display.

Figure 2:
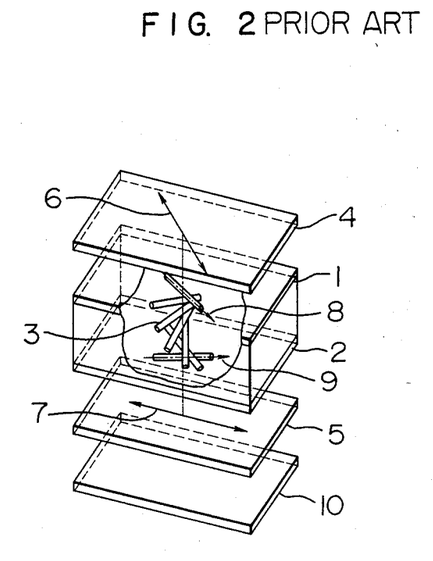
FIG. 2 is a schematic diagram illustrating a prior art supertwisted nematic type liquid crystal display device.

FIG. 2 schematically illustrates a prior art liquid crystal display device having excellent time-division driving characteristics realized hitherto. As shown in FIG. 2, a nematic liquid crystal 3 having positive dielectric anisotropy is sealingly disposed in a gap between two electrode substrates 1 and 2, with liquid crystal molecules oriented as depicted roughly. The liquid crystal molecules are twisted over the gap between the substrates by an angle which exceeds 90°, preferably, falls within a range of from 180° to 270° to have a twisted helical structure. Polarizer plates 4 and 5 are disposed exteriorly of the electrode substrates 1 and 2, with their polarization axes (absorption axes) oriented to make a suitable angle to a reference direction to be described later. Typically, this angle falls within a range of from 20° to 70°.

The liquid crystal display device of the above construction is detailed in U.S. Pat. No. 4,443,065 or an article by D. J. Sheffer entitled "24×80 Character LCD Panel Using the Supertwisted Birefringence Effect", SID, 1985 Digest, pp. 120–123.

In order to obtain the twisted helical structure wherein the liquid crystal molecules are twisted over the gap between the two electrode substrates by an angle falling within the range of from 180° to 270°, a so-called rubbing process may exemplarily be employed by which one surface, contiguous to the liquid crystal, of each electrode substrate is rubbed using a cloth in one direction. The liquid crystal molecules are oriented in the same directions as rubbing directions 8 and 9 in this rubbing process. The two electrode substrates 1 and 2 thus treated for orientation are disposed opposingly to provide the gap, with their rubbing directions 8 and 9 intersecting with each other to subtend an angle ranging from about 180° to about 270°, and these electrode substrates 1 and 2 are bonded together using seal agent. When the nematic liquid crystal 3 having positive dielectric anisotropy is sealingly filled in the gap, the liquid crystal molecules are rotated and oriented over the gap between the electrode substrates by an angle which ranges from about 180° to 270° to have a twisted helical structure. The polarizer plate 4 is disposed above the substrate 1 and the polarizer plate 5 is disposed below the substrate 2. In order to optimize contrast, it is necessary that the polarization axis (or absorption axis) 6 or 7 of each polarizer plate make, clockwise or counterclockwise, an angle of 0° to 70° to the orientation direction of liquid crystal molecules contiguous to each electrode substrate.

In the example of FIG. 2, a backlighting source 10 is provided to carry out the transmission mode operation but a reflection plate may be provided in place of the backlighting source 10 to perform the reflection mode operation in accordance with substantially the same operational principle as that of the transmission mode.

Figure 3:
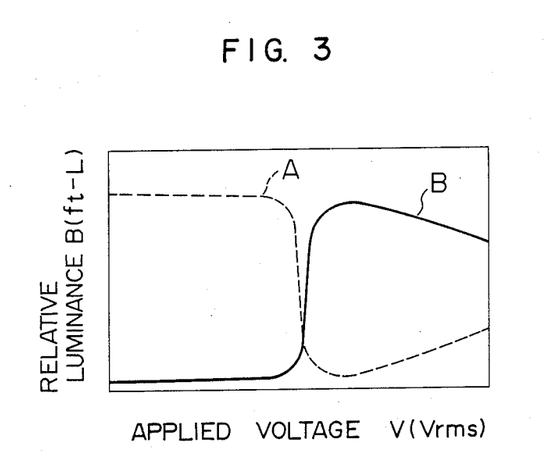
FIG. 3 is a graph showing the relation between voltage applied for display and luminance in the liquid crystal display devices of the prior art and the invention.

In the liquid crystal display device of the above construction, voltage applied for display is related to luminance as graphically shown in FIG. 3. FIG. 3 demonstrates that in two modes, normally-open mode A and normally-closed mode B, the luminance steeply falls or rises in response to a voltage applied. Thanks to these characteristics, the high time-division driving can be ensured without degrading contrast.

Figure 4:
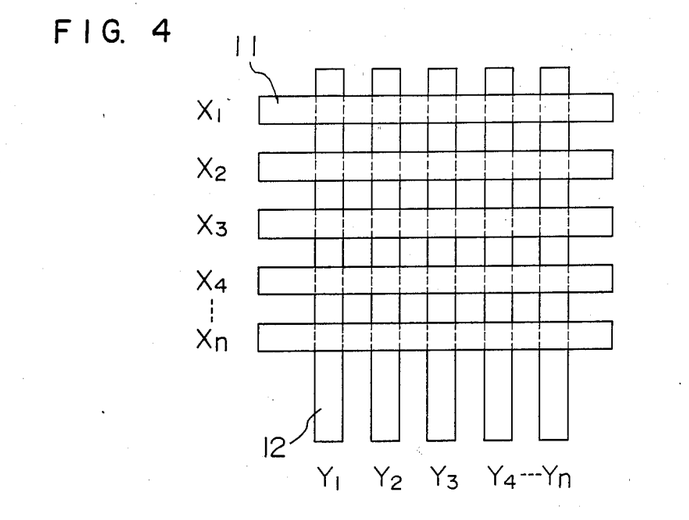
FIG. 4 is a diagram illustrating the construction of electrodes in a dot matrix display to explain time-division driving.

The time-division driving will now be described in brief by taking dot matrix display, for instance. As shown in FIG. 4, stripe-shaped Y electrodes (signal electrodes) 12 are formed on the lower electrode substrate and stripe-shaped X electrodes (scanning electrodes) 11 are formed on the upper electrode substrate. Thus, a character or the like is displayed by turning on or off liquid crystal elements at cross points of the X electrodes and Y electrodes. In FIG. 4, sequential scanning of n scanning electrodes $X_1, X_2, -X_n$ is reiteratively repeated to perform the time-division driving. When a scanning electrode ($X_n$ in the Figure) is selected, some pixels and the remaining pixels on that scanning electrode are simultaneously applied with display selection signals and display non-selection signals according to a signal to be displayed through the signal electrodes 12 represented by $Y_1, Y_2-Y_n$. In this manner, cross points are selectively turned on or off using a combination of a scanning electrode 11 and voltage pulses applied to the signal electrodes 12. In this example, the number of scanning electrodes X corresponds to the number of time divisions.

Figure 5:
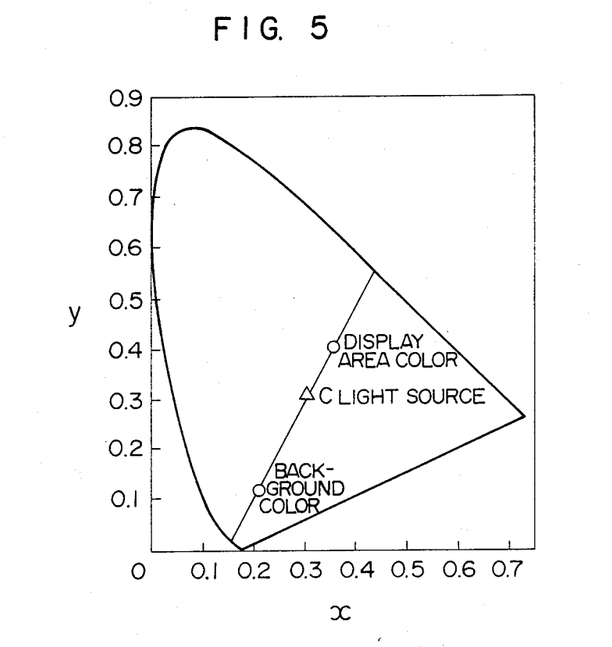
FIG. 5 is a diagram showing CIE chromaticity coordinates on which background color and display area color in the prior art supertwisted nematic type liquid crystal display device are indicated.

Although the prior art liquid crystal display device called a supertwisted nematic type has the excellent time-division driving characteristics as described previously, it disadvantageously colors at least one of the background and display area as will be seen from FIG. 5 in which background color and display area color are indicated on CIE chromaticity coordinates, failing to perform monochromatic or black and white display.

In recent years, however, improvements in the quality of picture of liquid crystal display devices and an increase in the amount of information to be displayed have been urgently demanded, and specifications for monochromatic display and advanced up-to-date color display have not met demanded ones.

The conventional technique does not take it into account to make the background color white and the display area color black and is only permitted to provide limited display quality. Further, in the conventional technique, at least one of the background and display area is colored and therefore, color display can not be realized using a color filter in combination.

SUMMARY OF THE INVENTION

An object of this invention to permit monochromatic display and color display by reducing coloring of the background and display area to make background color and display area color approximate achromatic color.

According to the invention, the above object can be accomplished by a phase plate adapted to correct the phase of transmission light which is colored under the influence of birefringence determined by structural conditions of the liquid crystal display device.

In the liquid crystal display device called the supertwisted nematic type, at least one of the background and display area is colored. The phase of colored light from at least one of the background and display area is corrected by means of the birefringent phase plate to reduce coloring of the background and display area, thereby making background color and display area color approximate achromatic color. As a result, in the conventional supertwisted nematic liquid crystal display device in which at least one of the background and display area is colored, coloring of the background and display area can be reduced and monochromatic display can be ensured.

Other objects and features of the invention will become apparent from the following description taken in conjunction with the accompanying drawings.

DESCRIPTION OF THE PREFERRED EMBODIMENTS

A preferred embodiment of a liquid crystal display device according to the invention will be described with reference to the accompanying drawings.

Figure 6:
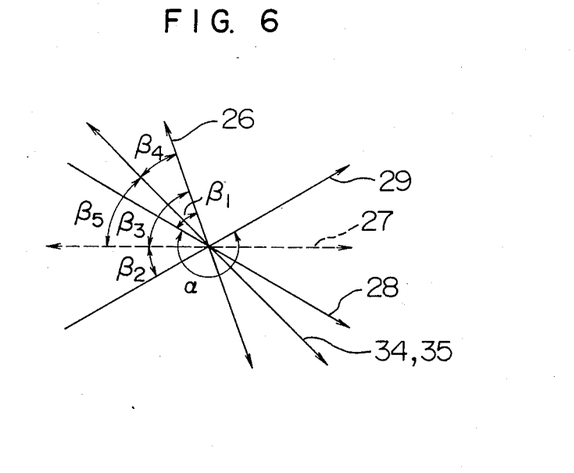
FIG. 6 is a diagram showing the orientation direction of liquid crystal molecules (for example, rubbing direction), the twisting direction of liquid crystal molecules and the absorption axis (or polarization axis) of polarizer plate as seen when the liquid crystal display device of the invention is viewed from above.
Figure 7:
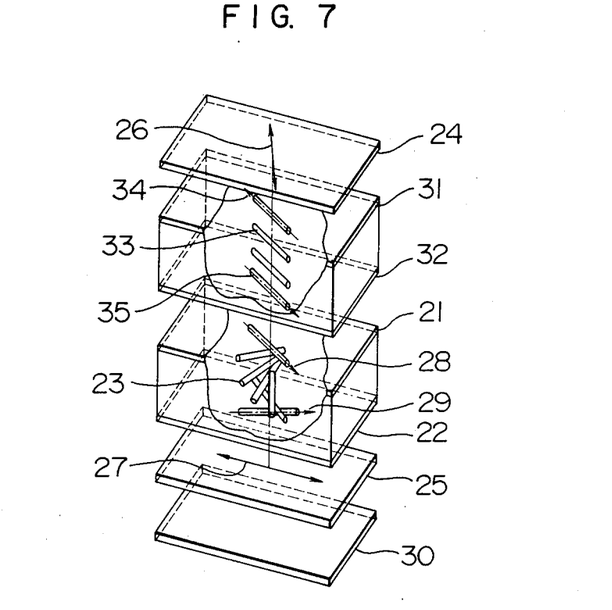
FIG. 7 is a schematic diagram showing a liquid crystal display device according to another embodiment of the invention in which the relation in FIG. 6 is established.

Referring particularly to FIG. 6, the orientation direction of liquid crystal molecules (for example, rubbing direction), the twisting direction of liquid crystal molecules and the absorption axis (or polarization axis) of plarizer plate are seen as illustrated when a liquid crystal display device of the invention as shown in FIG. 7 is viewed from above. FIG. 7 illustrates, in perspective view form, the liquid crystal display device in which the relation in FIG. 6 is established.

The twisting direction and twist angle $\alpha$ of liquid crystal molecules 23 depend on a rubbing direction 28 of upper electrode substrate 21, a rubbing direction 29 of lower electrode substrate 22 and the kind and amount of a rotary polarization material added to the nematic liquid crystal. The twist angle $\alpha$ exceeds 90°, preferably, falls within a range of from 180° to 270°.

Since the present embodiment intends to provide a liquid crystal display device which can, even for 200 or more of scanning lines, provide monochromatic display at satisfactory contrast, the twist angle $\alpha$ is selected to be 260°.

When no phase plate is used, an angle $\beta_3$ subtended by a polarization axis (or absorption axis) 26 of upper plarizer plate 24 and that 27 of lower polarizer plate 25 is preferably selected to range from 0° to 60° in consideration of contrast, brightness and color. However, in the present embodiment using the phase plate, for example, a phase plate of G1225DU manufactured by NITTO DENKO, the angle $\beta_3$ is selected to be 20°. Preferably, an angle $\beta_1$ subtended by the polarization axis (or absorption axis) 26 of upper polarizer plate 24 and the rubbing direction 28 of upper electrode substrate 21 and an angle $\beta_2$ subtended by the polarization axis (or absorption axis) 27 of lower polarizer plate 25 and the rubbing direction 29 of lower electrode substrate 22 are respectively selected to range from 0° to 60° in consideration of contrast, brightness and color. In this embodiment, the angle $\beta_1$ is selected to be 20° and the angle $\beta_2$ is selected to be 40°.

Characteristics of the liquid crystal display device in accordance with the present embodiment shows remarkable dependency on $\Delta n \cdot d$, where $\Delta n$ represents anisotropy of birefringence index of liquid crystal layer and d represents the thickness thereof, and they can be excellent when the condition $0.4 \mu m \leq \Delta n \cdot d \leq 1.0 \mu m$ is satisfied in consideration of contrast, brightness and color. The value of $\Delta n$ depends on wavelength of light and tends to be large for short wavelength and small for long wavelength. Values of $\Delta n$ described in the present specification are measured at 25° C. by using a He-Ne laser beam of a wavelength of 6328 Å. In this embodiment, the nematic liquid crystal containing as a principal constituent a biphenyl liquid crystal and an ester cyclohexane liquid crystal is added by 0.5 weight percent with a rotary polarization material of S811 manufactured by Merk Corporation. In this embodiment, the liquid crystal has $\Delta n = 0.083$ and the thickness of liquid crystal layer is 6 $\mu m$. Accordingly, $\Delta n \cdot d$ of the liquid crystal element in accordance with this embodiment is set to 0.5.

With the liquid crystal element combined with the polarizer plates as above, the background and display area are disadvantageously colored as described hereinbefore. To eliminate this disadvantage, according to the present invention, a phase plate for making background color and display area color approximate achromatic color is interposed between the liquid crystal element and the upper polarizer plate 24.

More particularly, used as the phase plate for making background color and display area color approximate achromatic color is an element having two glass substrates 31 and 32 defining a gap therebetween in which a liquid crystal 33 having a twist angle $\alpha$ of 0° to assume so-called parallel orientation is sealingly disposed.

Generally, in connection with the parallel orientation liquid crystal element used as the phase plate, it is preferred by taking it into account to provide complementary color of background color and display area color in the liquid crystal display device that an angle $\beta_4$ subtended by a rubbing direction 34 of upper substrate 31 and the polarization axis 26 of the upper polarizer plate 24 and an angle $\beta_5$ subtended by a rubbing direction 35 of lower substrate 32 and the polarization axis 27 of the lower polarizer plate 25 respectively range from 0° to 60°.

In this embodiment, the angle $\beta_4$ is set to 25° for the angle $\beta_5$ being 45° or the angle $\beta_4$ is set to 65° for the angle $\beta_5$ being 45°, and $\Delta n \cdot d$ of the parallel orientation liquid crystal element serving as the phase plate is set to 0.36.

In this embodiment, a cold cathode tube is used as a light source 30 but alternatively a hot cathode tube or an electroluminescent source may be used.

With the liquid crystal display device constructed as above, background color and display area color can be made to approximate achromatic color. The twist angle $\alpha$ is 260° in the liquid crystal display device according to the present embodiment but the twist angle falling within the range of from 180° to 270° or even more than 270° is satisfactory for the purpose of making the background color and display area color approximate achromatic color.

Even if the light source 30 of cold cathode tube in this embodiment is replaced with a reflection plate using external light, achromatic color can be obtained in a similar way.

Figure 8:
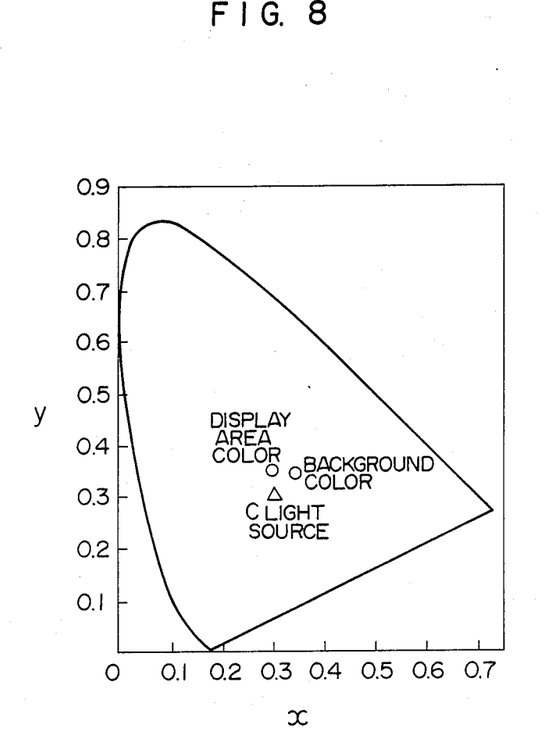
FIG. 8 is a diagram showing CIE chromaticity coordinates on which background color and display area color in the liquid crystal display device in this invention are indicated.

FIG. 8 shows CIE chromaticity coordinates on which background color and display area color in this embodiment are indicated. As is clear from the figure, the background color and display area color both approximate the C light source and consequently achromatic color, indicating that monochromatic display can be provided. In this case, the contrast ratio standing for the ratio between luminance during white display and luminance during black display is 9 to 1.

Figure 9:
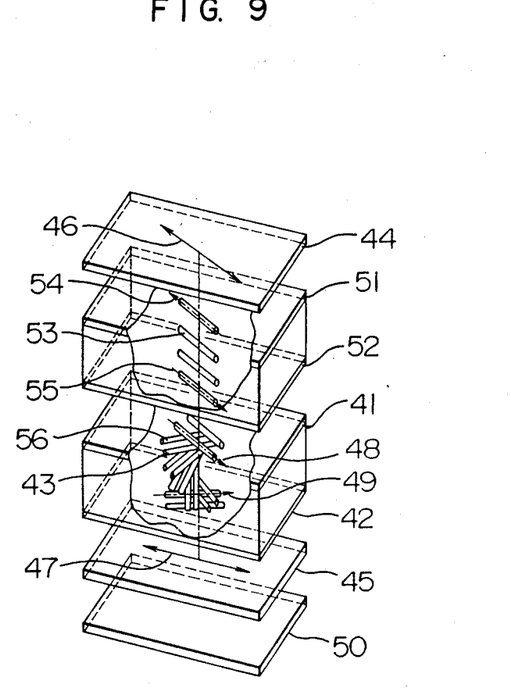
FIG. 9 is a schematic diagram illustrating a liquid crystal display device according to still another embodiment of the invention.

FIG. 9 shows the construction of a liquid crystal display device according to another embodiment of the invention. This embodiment is identical to the FIG. 7 embodiment, excepting that the liquid crystal element shown in FIG. 7 having the twist angle $\alpha$ of 260° and the $\Delta n \cdot d$ of 0.5 is replaced with a guest/host type liquid crystal element in which the liquid crystal material having the twist angle $\alpha$ of 260° and the $\Delta n \cdot d$ of 0.5 is added with a black dichroic coloring matter by 0.15 weight percent.

Figure 10:
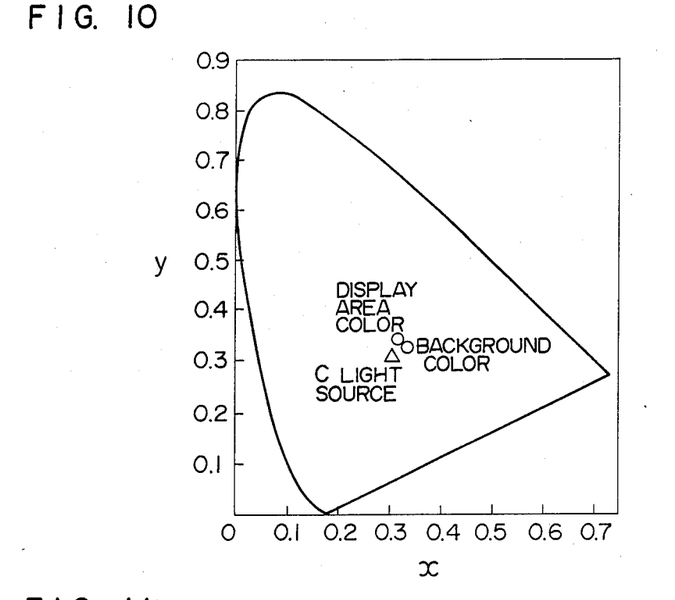
FIG. 10 is a diagram showing CIE chromaticity coordinates on which background color and display area color in the liquid crystal display device of the FIG. 9 embodiment shown in FIG. 9 are indicated.

FIG. 10 shows CIE chromaticity coordinates on which background color an display area color in this embodiment are indicated. As is clear from the figure, the background color and display area color both approximate the C light source and consequently achromatic color to ensure monochromatic display which is of higher grade than that obtained with the FIG. 7 embodiment. In this case, the contrast ratio, i.e., the ratio between luminance during white display and luminance during black display is 15 to 1.

The liquid crystal elements in the previous two embodiments have the $\Delta n \cdot d$ of 0.5 but a liquid crystal element having a value of $\Delta n \cdot d$ ranging from 0.6 to 0.97 may also be used to provide similar monochromatic display.

A liquid crystal display device directed to such a modification may have the same construction as that of the liquid crystal display devices shown in FIGS. 7 and 9 but a liquid crystal element used as the phase plate has a twist angle $\alpha$ of 180°. In this case, the angles $\beta_1$, $\beta_2$, $\beta_3$, $\beta_4$ and $\beta_5$ are 50°, 30°, 20°, 25° and 45°, respectively.

Figure 13:
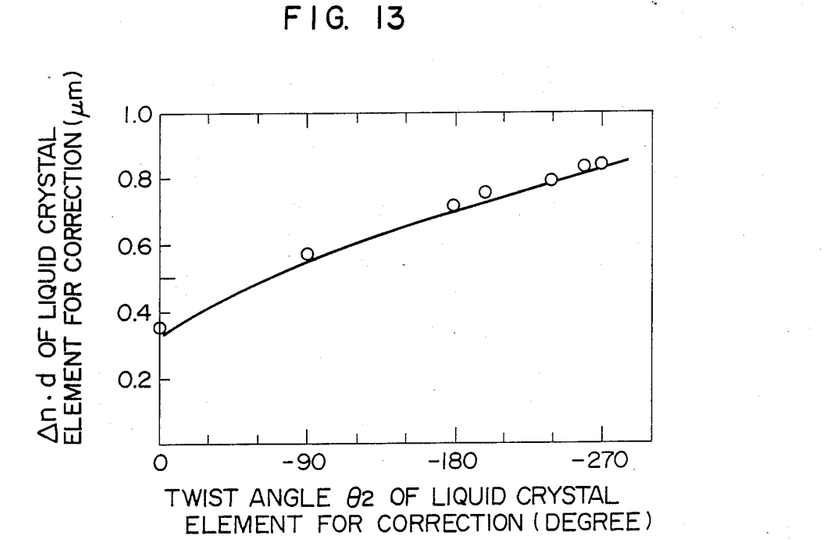
FIG. 13 is a graph showing the relation between twist angle and $\Delta n \cdot d$ in a liquid crystal element for correction used as a phase plate.

In the liquid crystal element for correction used as the phase plate, the twist angle ($\theta_2$) is preferably related to $\Delta n \cdot d$ as graphically shown in FIG. 13.

Figure 11:
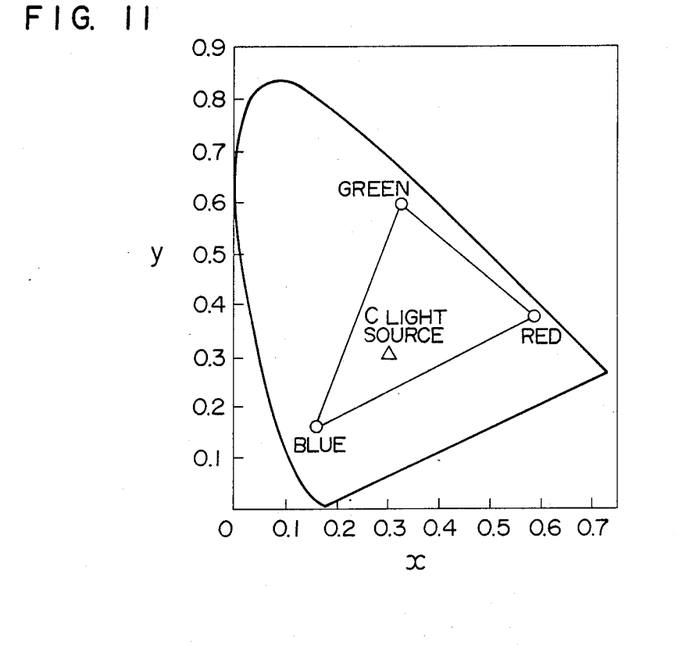
FIG. 11 is a diagram showing CIE chromaticity coordinates on which display color in a liquid crystal display device having an organic color filter is indicated.
Figure 12:
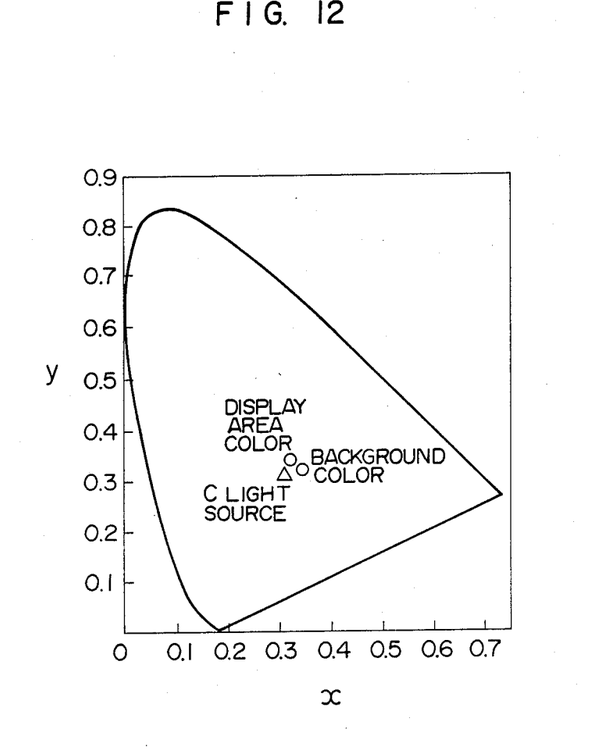
FIG. 12 is a diagram showing CIE chromaticity coordinates on which background color and display area color in the liquid crystal display device referred to in FIG. 11 are indicated.

When the liquid crystal display device shown in FIG. 9 is used in combination with an organic or inorganic color filter and driven at a duty ratio of 1/200, display color is obtained as indicated on CIE chromaticity coordinates shown in FIG. 11.

As is clear from FIG. 11, respective colors have high color purity and the range of color display is wide. The organic or inorganic color filter used in the present embodiment is the same filter as used for liquid crystal color television receiver sets.

Figure 1:
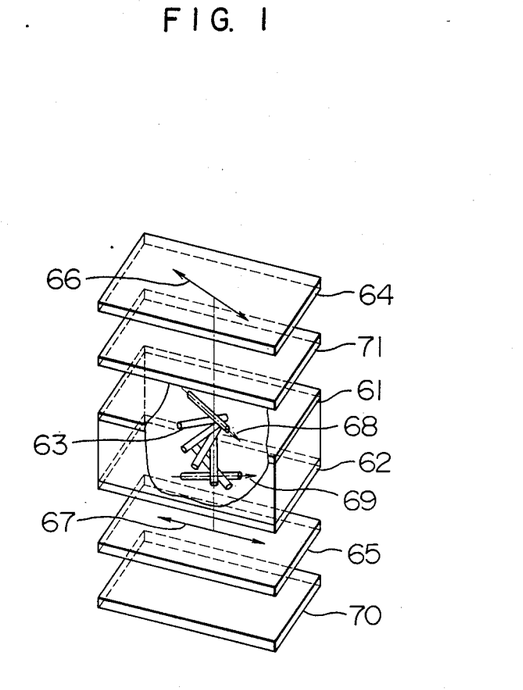
FIG. 1 is a schematic diagram illustrating a liquid crystal display device according to an embodiment of the invention.

Referring to FIG. 1, there is illustrated a liquid crystal display device according to still another embodiment of the invention. This embodiment is identical to the foregoing embodiments with the only exception that a film 71 having birefringence substitutes, as shown in FIG. 1, for the parallel orientation liquid crystal element used as the phase plate.

A liquid crystal element in this embodiment includes an upper electrode substrate 61 having a rubbing direction 68, a lower electrode substrate 62 having a rubbing direction 69 and a liquid crystal 63 filed in a gap between the two substrates. Values of the twist angle, anisotropy of birefringent index $\Delta n$, thickness of liquid crystal layer are equal to those in the embodiment of FIG. 7, amounting to 260°, 0.083 and 6 $\mu$m, respectively. Polarizer plates 64 and 65 are respectively disposed above and below the liquid crystal element and polarization axes (or absorption axes) 66 and 67 of these polarizer plates are related to the rubbing directions in the same manner as in the case of the FIG. 7 embodiment. A backlighting source 70 is disposed below the lower polarizer plate 65. This backlighting source is also realized with a three-wave type cold cathode tube. In this supertwisted nematic liquid crystal display device constructed as above, the film 71 having birefringence is interposed between the upper polarizer plate 64 and to liquid crystal element and phase correction is effected by the film 71. In this embodiment, the additional liquid crystal element, i.e., the parallel orientation liquid crystal element provided in the previous embodiments can be omitted.

For the formation of the film 71 used in this embodiment, a polycarbonate film is subjected to one-axis expansion to assume birefringence. When the liquid crystal element has a twist angle of 240° and a $\Delta n \cdot d$ value of 0.8 $\mu$m, the film 71 has a value of the product of $\Delta n$ and d which is about 0.4 $\mu$m and when the liquid crystal element has a twist angle of 240° and a $\Delta n \cdot d$ value of 1.2 $\mu$m, the $\Delta n \cdot d$ in the film 71 is about 0.7 $\mu$m. In this case, the angle subtended by the rubbing direction 68 of the upper substrate and the expansion axis (i.e., optical main axis) of the film is about 90°. Values of $\Delta n \cdot d$ in the liquid crystal element and corresponding values of $\Delta n \cdot d$ in the film are suitably selected in accordance with the conditions of the liquid crystal display device.

Figure 14:
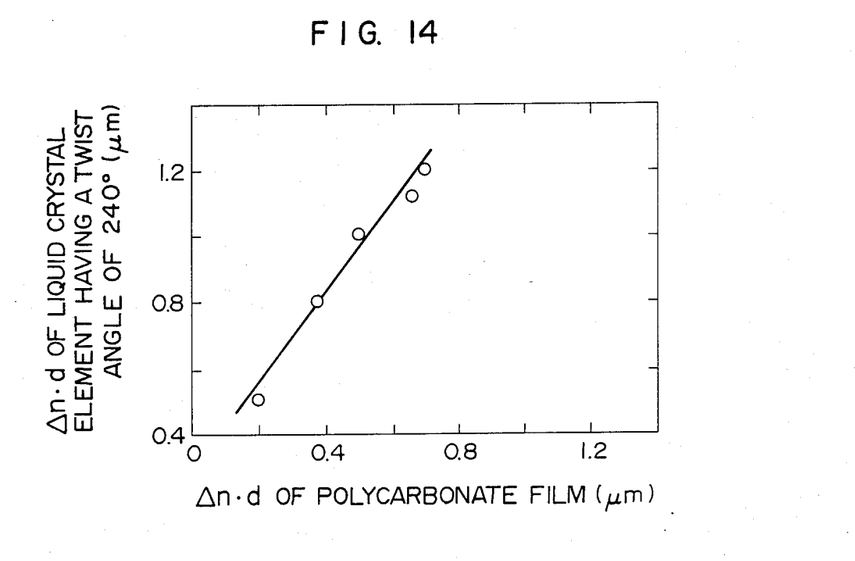
FIG. 14 is a graph showing the relation between $\Delta n \cdot d$ of a film used as a phase plate and $\Delta n \cdot d$ of a liquid crystal element.

With the twist angle of the liquid crystal display device being 240°, values of $\Delta n \cdot d$ of liquid crystal layer may preferably be combined with values of $\Delta n \cdot d$ in the film used as the phase plate, as enumerated in Table 1 and as plotted in a graph of FIG. 14.

TABLE 1

| $\Delta n \cdot d$ of liquid crystal layer (μm) | $\Delta n \cdot d$ in film (μm) |
|---|---|
| 0.52 | 0.18 |
| 0.80 | 0.36 |
| 1.00 | 0.49 |
| 1.15 | 0.67 |
| 1.20 | 0.70 |

To obtain optimum values of $\Delta n \cdot d$, the film 71 may be made of various transparent materials such as polyvinyl alcohol and tri-anil cyanolate.

Obviously, a plurality of films may be superposed on each other to obtain an optimum value of $\Delta n \cdot d$.

The liquid crystal display device has been described as having the phase plate in the form of the parallel orientation liquid crystal element or the birefringent plastic film interposed between the liquid crystal element having a twist angle $\alpha$ ranging from 180° to 270° and the upper polarizer plate, but a similar phase plate may be interposed between the liquid crystal element and the lower polarizer plate to make background color and display area color approximate achromatic color, thereby providing monochromatic display.

As described above, the liquid crystal element is combined with the birefringent member to make the background color and display area color approximate achromatic color and consequently ensure monochromatic display. The thus achievable monochromatic display ensures that color display can be realized in the supertwisted nematic liquid crystal display device through generally known coloring process utilizing color filters of three primary colors arranged in mosaic configuration.

As the phase plate, the liquid crystal element or the film is used and especially, the latter has been proven experimentally to have high transmittivity and may be used with the reflection type liquid crystal display device to attain remarkable effects.

As has been described, according to the invention, the background color and display area color can be made to approximate achromatic color, thereby ensuring monochromatic display and consequent color display.

We claim:

1. A liquid crystal display device comprising:
   a liquid crystal layer of the twist nematic type having a twist angle which exceeds 90°, said layer being interposed between a plurality of electrodes which are opposed to each other;
   a pair of polarizer plates so disposed as to sandwich said liquid crystal layer; and
   a phase plate means for providing phase correction interposed between said pair of polarized plates, said phase plate means comprising a birefringent organic film having substantially the same characteristic of wavelength dispersion as that of said liquid crystal layer and with a selected optical thickness determined by the optical thickness and twist angle of the liquid crystal layer, said phase plate means being disposed at an angle with respect to a polarization axis or absorption axis of the polarizer plate to cause birefrigence to retard an overall wavelength of visible light.

2. A liquid crystal display device according to claim 1 wherein said film is made of an organic material including polycarbonate, polyvinyl alcohol or tri-anil cyanolate.

3. A liquid crystal display device according to claim 1 wherein said liquid crystal layer has the product of anisotropy of birefringent index $\Delta n$ and layer thickness d which ranges from 0.4 μm to 2.5 μm.

4. A liquid crystal display device according to claim 3, wherein said birefringent organic film is disposed closer to a backlight than said liquid crystal layer.

5. A liquid crystal display device according to claim 1 wherein said liquid crystal layer has the product of anisotropy of birefringent index $\Delta n$ and layer thickness d which ranges from 0.4 μm to 1.0 μm.

6. A liquid crystal display device according to claim 5, wherein said phase plate means is made up of a plurality of the organic films superimposed on each other.

7. A liquid crystal display device according to claim 1, wherein said birefringent organic film is made of tri-anil cyanolate.

8. A liquid crystal display device according to claim 1, wherein said twist angle of the liquid crystal layer ranges between 180 ° and 270°.

9. A liquid crystal display device comprising:
   a first liquid crystal layer of the twist nematic type having a twist angle which exceeds 90°, said layer being interposed between a plurality of electrodes which are opposed to each other;
   a pair of polarizer plates so disposed as to sandwich said first liquid crystal layer; and
   at least one second liquid crystal layer having a twist angle which is substantially 0° or 180° and interposed between said paired polarizer plates.

10. A liquid crystal display device according to claim 9 wherein said first liquid crystal layer has the product of anisotropy of birefringent index $\Delta n$ and layer thickness d which ranges from 0.4 μm to 82.5 μm.

11. A liquid crystal display device according to claim 9 wherein said first liquid crystal layer has the product of anisotropy of birefringent index $\Delta n$ and layer thickness d which ranges from 0.4 μm to 1.0 82 m.

12. A liquid crystal display device according to claim 9, wherein the twist angle of the first liquid crystal layer ranges between 180° and 270 °.

* * * * *